US009658819B2

(12) United States Patent
Wellman et al.

(10) Patent No.: US 9,658,819 B2
(45) Date of Patent: May 23, 2017

(54) SYSTEMS AND METHODS FOR AUTONOMOUSLY SCHEDULING AND PLAYING AUDIO FILES

(71) Applicants: Willard Frederick Wellman, Valparaiso, IN (US); Christopher Carl Spurrier, Portage, IN (US); Scott Robert Wellman, Beverly Shores, IN (US); Guy Robert Wellman, Valparaiso, IN (US)

(72) Inventors: Willard Frederick Wellman, Valparaiso, IN (US); Christopher Carl Spurrier, Portage, IN (US); Scott Robert Wellman, Beverly Shores, IN (US); Guy Robert Wellman, Valparaiso, IN (US)

(*) Notice: Subject to any disclaimer, the term of this patent is extended or adjusted under 35 U.S.C. 154(b) by 0 days.

(21) Appl. No.: 14/583,962

(22) Filed: Dec. 29, 2014

(65) Prior Publication Data
US 2015/0186105 A1    Jul. 2, 2015

Related U.S. Application Data

(60) Provisional application No. 61/921,870, filed on Dec. 30, 2013.

(51) Int. Cl.
G06F 17/00 (2006.01)
G06F 3/16 (2006.01)
G05B 15/02 (2006.01)
G06F 17/30 (2006.01)
G06Q 10/10 (2012.01)
H04N 21/482 (2011.01)
H04N 21/432 (2011.01)

(52) U.S. Cl.
CPC .............. G06F 3/165 (2013.01); G05B 15/02 (2013.01); G06F 17/3074 (2013.01); G06Q 10/109 (2013.01); H04N 21/4325 (2013.01); H04N 21/4825 (2013.01)

(58) Field of Classification Search
CPC ...... G04G 13/026; G04G 13/02; G04G 13/00; G06Q 10/109; Y10S 715/963
See application file for complete search history.

(56) References Cited

U.S. PATENT DOCUMENTS

| 4,659,231 | A | 4/1987 | Barkouki |
| 6,011,755 | A | 1/2000 | Mulhall et al. |
| 6,369,698 | B1 | 4/2002 | Valente |
| 6,678,215 | B1 | 1/2004 | Treyz et al. |
| 7,376,051 | B2 | 5/2008 | Rosen |
| 7,668,936 | B1 * | 2/2010 | Krikorian et al. ............ 709/219 |
| 8,437,225 | B2 | 5/2013 | Bull et al. |

(Continued)

*Primary Examiner* — Curtis Kuntz
*Assistant Examiner* — Thomas Maung
(74) *Attorney, Agent, or Firm* — Hartman Global IP Law; Gary M. Hartman; Michael D. Winter

(57) ABSTRACT

Systems and methods for autonomously playing audio files at predeterminable times of a day, week, and/or year, including but not limited to astronomical events, for example, dusk or dawn. The systems and methods employ a computer program running on a standalone computer connected to an audio power amplifier and speaker system. The computer program includes an always-running service configured to execute a scheduling algorithm that causes selected audio files to be played according to one or more schedules.

18 Claims, 4 Drawing Sheets

(56) References Cited

U.S. PATENT DOCUMENTS

| | | |
|---|---|---|
| 2005/0125087 A1* | 6/2005 | Ben-Yaacov et al. .......... 700/94 |
| 2005/0169110 A1 | 8/2005 | Mazzilli |
| 2005/0237859 A1 | 10/2005 | Jibrin |
| 2006/0083113 A1* | 4/2006 | Shebani ............... G04G 9/0076 368/47 |
| 2006/0146652 A1* | 7/2006 | Huizi ................... G04G 9/0076 368/107 |
| 2007/0097793 A1 | 5/2007 | Nguy et al. |
| 2007/0159926 A1 | 7/2007 | Prstojevich |
| 2008/0033990 A1* | 2/2008 | Hutson et al. ............. 707/104.1 |
| 2009/0175131 A1 | 7/2009 | Jackson |
| 2009/0190443 A1* | 7/2009 | Huizi ................... G04G 9/0076 368/10 |
| 2011/0106736 A1* | 5/2011 | Aharonson .......... G06Q 10/109 706/12 |
| 2011/0148606 A1* | 6/2011 | Glee .................. G06Q 10/1091 340/309.7 |
| 2012/0252484 A1* | 10/2012 | Andrews ................ H04W 4/02 455/456.1 |
| 2013/0070567 A1 | 3/2013 | Marzouq |
| 2013/0083632 A1* | 4/2013 | Al Abdeen ............ G04G 21/04 368/10 |
| 2013/0151529 A1* | 6/2013 | Duchene ............. G05B 19/106 707/737 |
| 2014/0093085 A1* | 4/2014 | Jarvis et al. ..................... 381/17 |
| 2014/0281971 A1* | 9/2014 | Isbell, III .......... G06F 17/30053 715/716 |
| 2015/0078141 A1* | 3/2015 | Ghassemi ............ G06Q 10/109 368/28 |

* cited by examiner

SYSTEMS AND METHODS FOR AUTONOMOUSLY SCHEDULING AND PLAYING AUDIO FILES

CROSS REFERENCE TO RELATED APPLICATIONS

This application claims the benefit of U.S. Provisional Application No. 61/921,870, filed Dec. 30, 2013, the contents of which are incorporated herein by reference.

BACKGROUND OF THE INVENTION

The present invention is in the technical field of audio equipment. The invention particularly relates to systems and methods for autonomously playing audio files, and more particularly at specific times of the day, week, and year, for example, relative to astronomical events.

Conventional music players are not typically automated to operate at specific times. Instead, they ordinarily require human intervention to play audio files at specific times, for example, on a particular day or at a particular time of day. Playing audio files at specific times requires an operator to be present at those times to manually start the playing of such audio files. If the desire is to play an audio file at a specific time of day, for example, at an astronomical event such as dusk or dawn, the operator must further determine the time of the event for that particular day and manually initiate the playing of the audio file at the determined time. Timing is further complicated if the desire is to begin or complete the playing of an audio file at a time offset from the event, for example, prior to or after dusk or dawn.

Systems are known for controlling lights to save energy, for example, with light sensors that supply power to light sources when ambient light declines around sunset. However, the sensors do not operate on the actual time of sunset (or other astronomical event), but rather simply sense ambient light that not only depends on the astronomical event, but also the location of the sensor, cloud cover, etc.

BRIEF DESCRIPTION OF THE INVENTION

The present invention provides systems and methods for autonomously playing audio files at predeterminable times of a day, week, and/or year, including but not limited to astronomical events, for example, dusk or dawn. The systems and methods employ a computer program, for example, running on a standalone computer connected to an audio power amplifier and speaker system. The computer program includes an always-running service configured to execute a scheduling algorithm.

Technical effects of a system and method as described above preferably include the ability to automate the playing of an audio file at a predetermined scheduled time during a day, month, and/or year. A particular example is the ability to automate the playing of one or more audio files for ceremonial, religious, personal, or military-related reasons at one or more astronomical events of a day, and to play the audio files based on the actual timing of an astronomical event rather than simply sensing ambient light. Another preferred aspect is the ability to combine such a capability with a system that can play audio files according to a play list.

Other aspects and advantages of this invention will be appreciated from the following detailed description.

DETAILED DESCRIPTION OF THE INVENTION

As a matter of convenience, the term "timeline audio player system" (or simply, system) will be used herein to refer to systems capable of autonomously playing selected audio files (for example, MP3), which as used herein refers to the ability to play the selected audio files at predeterminable times of a day, week, and/or year according to one or more schedules, such that a user is not required to manually initiate the playing of the audio files at the desired times of a day, week, year, etc.

In broad embodiments, the present invention is a timeline audio player system capable of running a scheduling algorithm adapted to play one or more predetermined audio files at one or more predetermined scheduled times of a day, week, and/or year according to one or more schedules. In addition to "repetitive events" that occur at specific recurring times in a 24-hour period (e.g., identified by hour, minute, etc.) or on specific recurring days in a year (e.g., Christmas), such scheduled times may include one or more "moving events" whose times vary on a daily, weekly, or yearly basis. One such example is astronomical events, for example, at or near dawn or dusk (such as sunrise, astronomical dawn, nautical dawn, civil dawn, sunset, astronomical dusk, nautical dusk, and/or civil dusk), which vary day to day and by location. Another such example is holidays that do not fall on the same day every year, for example, Easter. The schedule preferably enables the predetermined scheduled times to be offset from an astronomical event (hereinafter, "programmable offset times"), for example, at a time prior to or after an astronomical event to enable the playing of an audio file to begin or be completed at a time that is offset from the event. The system may also be adapted to cause an audio signal of a predetermined audio file to pass through another audio signal, by interrupting the other audio signal before playing the predetermined audio file and then restoring the other audio signal after playing the predetermined audio file.

Figure 1:
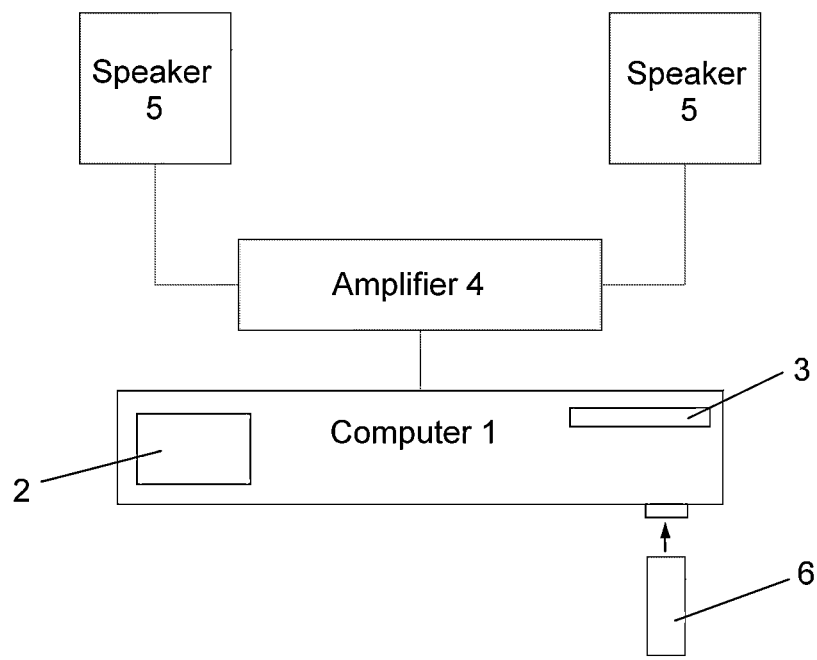
FIG. 1 is a block diagram of a timeline audio player system.

In a nonlimiting embodiment schematically represented in FIG. 1, such a timeline audio player system includes a standalone mini-PC computer 1 on which the scheduling algorithm runs. The scheduling algorithm is preferably a component of a computer program that includes a configuration application and an always-running service configured to execute the scheduling algorithm. The computer 1 may be, for example, an ARM-based SBC (single board computer) running any suitable operating system, with a touchscreen 2 used as an input device to the computer 1. The computer 1 preferably includes nonvolatile memory 3 (e.g., hard disk and/or solid state drive) on which may be stored the computer program and schedules. The memory 3 also preferably stores location information, for example, GPS (global positioning system) location files. The location information may comprise a look-up table that correlates locations, dates, and time zones to one or more astronomical events (e.g., civil dawn, sunrise, sunset, and/or civil dusk). As an example, a user can input the location of the system by zip code, town, etc., from which the configuration application of the system can retrieve from the lookup table the approximate GPS coordinates of the system, which the system can then use to calculate or otherwise ascertain the local time(s) for one or more astronomical events for each calendar date on which the audio file is to be played. Such location information can be inherent to some operating systems, for example, the Debian Linux Wheezy operation system, and only need be set and retrieved by the system. Due to capabilities of the types described above, the system is capable of operating on the basis of the actual time of one or more astronomical events, rather than relying on the sensing of ambient light which will not only depend on astronomical events, but also obstructions (e.g., trees, buildings, cloud cover) that interfere with the light reception of a light sensor. Consequently, the system is able to operate without a sensor for sensing ambient light.

The timeline audio player system is shown in FIG. 1 as further including an audio power amplifier 4 that amplifies the audio signal of the predetermined audio file before being broadcast as sound via speakers 5, for example, two or more 30 W high decibel (e.g., 107 dB) horn speakers. The system is represented as further including a flash drive 6 on which may be stored one or more audio files. The flash drive 6 may optionally also contain configuration information used by or relating to the system and its operation, and/or one or more schedules containing predetermined scheduled times that are utilized by the scheduling algorithm to determine when a predetermined audio file is to be played and broadcast by the system. A single schedule may be used by the system, though a preferred aspect of the invention is for the system to make use of multiple schedules, each having a unique identifier along with a list of selected audio files to be played in sequence according to the schedule. The components of the system may be wirelessly connected and/or connected via appropriate wires or cables, nonlimiting examples of which include speaker wires, mini phono jack cables, etc.

Figure 2A:
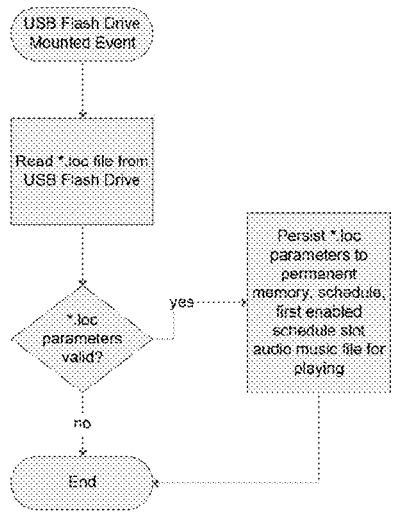
FIGS. 2A, 2B, and 2C represent software algorithm flow charts utilized by a scheduling algorithm running on a computer of a type represented in FIG. 1.
Figure 2B:
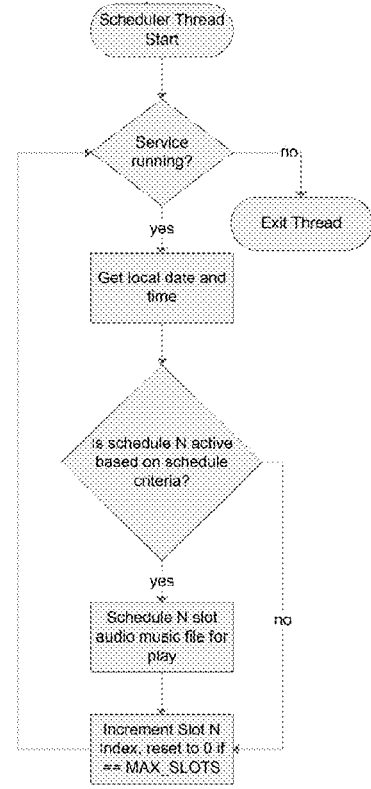
Figure 2C:
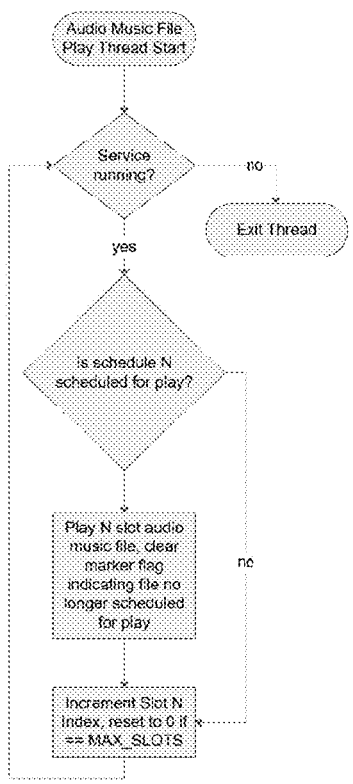

Referring now to FIGS. 2A, 2B, and 2C, there are shown three high level software algorithm flow charts. Code implementations of the algorithms represented in FIGS. 2A, 2B, and 2C, as well as the computer program (including the configuration application, always-running service, etc.) running on the computer 1, are well within the capabilities of those of ordinary skill in the relevant art, and therefore will not be described in any detail here.

A first of the algorithms (FIG. 2A) is initiated by a "USB flash drive mount event," by which the insertion of the flash drive 6 (which may utilize a USB connector or other suitable connector) in the computer 1 is detected in order to initiate a read from the flash drive 6. If the parameters of an audio file stored on the drive 6 are valid, the audio file can be selected and stored in the nonvolatile memory 3 of the computer 1 for use in a schedule by the scheduling algorithm.

FIG. 2B depicts a "scheduler thread" algorithm of the scheduling algorithm. This algorithm accesses "enabled" schedules stored in the nonvolatile memory 3 and monitors their "active" schedule time slots, which as used herein refers to predetermined scheduled times and therefore one or more local times of day associated with one or more predetermined audio files of that schedule that are to be played by the system. As such, the algorithm monitors each active schedule time slot ("N") stored in an enabled schedule based on the current local time. After confirming that the always-running service and its scheduling algorithm are running on the computer 1, the local date, time, and time zone are acquired (for example, from the nonvolatile memory 3 of the computer 1) and after comparing the local date and time to the enabled schedule (time of day, week, and/or year), if a time slot is found to be active, the audio file associated with the active time slot is flagged for playing, and the active time slot is incremented to the next predetermined scheduled time stored in the enabled schedule.

FIG. 2C depicts an "audio music file play thread" algorithm of the scheduling algorithm. This algorithm operates to ensure that all audio files on an enabled schedule are played and, once played, are marked as played and placed back on the schedule for playing at the next active schedule time slot associated with the audio file. Each audio file is played after confirming that the always-running service and its scheduling algorithm are running on the computer 1 and that the audio file is scheduled for play based on an active schedule time slot associated with the audio file, As indicated in FIGS. 2B and 2C, the scheduler thread and audio music file play thread algorithms are components of the always-running service and capable of constantly processing an enabled schedule containing 1 to N time slots, where each slot can be associated with either a repetitive event (e.g., a specific time during a 24-hour period) or moving event (e.g., a particular astronomical event during a 24-hour period). As such, each time slot can be set to be played on a daily, weekly or yearly basis, on one or more specific days of the week, or on one or more specific days of the year, for example, holidays that fall on the same calendar day every year (such as Christmas) and holidays that fall on a different calendar day every year (e.g., Easter), etc.

In view of the above, each entry in the schedule is associated with an audio file, for example, an audio music file, which may be stored in the nonvolatile memory 3 on the computer 1, and the associated audio file is played when its schedule criteria are met. The scheduler thread algorithm (FIG. 2B) is constantly comparing the enabled schedule(s) against the current date and time. If all the criteria for a given audio file of an enabled schedule are met, the audio file is played, whereby the corresponding audio signal is amplified by the power audio amplifier 4 before being broadcast by the speakers 5.

In view of the above, the system enables audio files to be uploaded into memory 3 on the computer 1, and enables one or more schedules to be stored locally in the memory 3 of the computer 1. A schedule may be in the form of a table that can be created with the configuration application running on the computer 1. With the configuration application, the touchscreen 3 can preferably be used to create new schedules (including selecting audio files to be included in a new schedule that is then stored in the memory 3), edit existing schedules (including adding and removing audio files from an existing schedule already stored in the memory 3), and delete schedules from the computer memory 3, as well as enable and disable existing schedules. A disabled schedule denotes a schedule whose audio files are not played by the system, but yet the schedule remains stored in memory 3 and therefore can be subsequently enabled. As feedback that the configuration of a particular schedule was successful, the system may operate to play a schedule's audio files when the schedule is first created. If multiple schedules are stored, a user may use the touchscreen to enable only one of the schedules such that that particular schedule is enabled in the system until a different schedule is enabled. Alternatively, the system may be configured to allow the user to organize or prioritize multiple schedules in any desired manner, with any of the schedules being enabled or disabled.

As another preferred feature of the invention, the computer program running on the computer 1 can be configured to cause an audio file to "pass through" another audio source to the power amplifier 4 and speakers 5 during an idle schedule time, in other words, between active schedule time slots. Once a time slot on the schedule becomes active, the passed-through audio source is muted, and the audio file associated with the time slot is played. Once the scheduled audio file has been played, the system may revert back to the passed-through audio signal. A particular example is that prioritization can be applied to different schedules, in other words, a time slot on one schedule may become active while an audio file of another schedule is playing, such that the system temporarily interrupts the audio file being played to play the audio file of the activated schedule. As an example, it may be desirable to create a first schedule whose audio files are played on a continuous loop during a given day (effectively, a play list), create a second schedule that schedules military taps to be played at or around an astronomical event (e.g., dusk) each day, and prioritize the second schedule so that the play list will be interrupted so that taps can be played in accordance with the second schedule, after which the system reverts to playing audio files from the play list.

Figure 3:
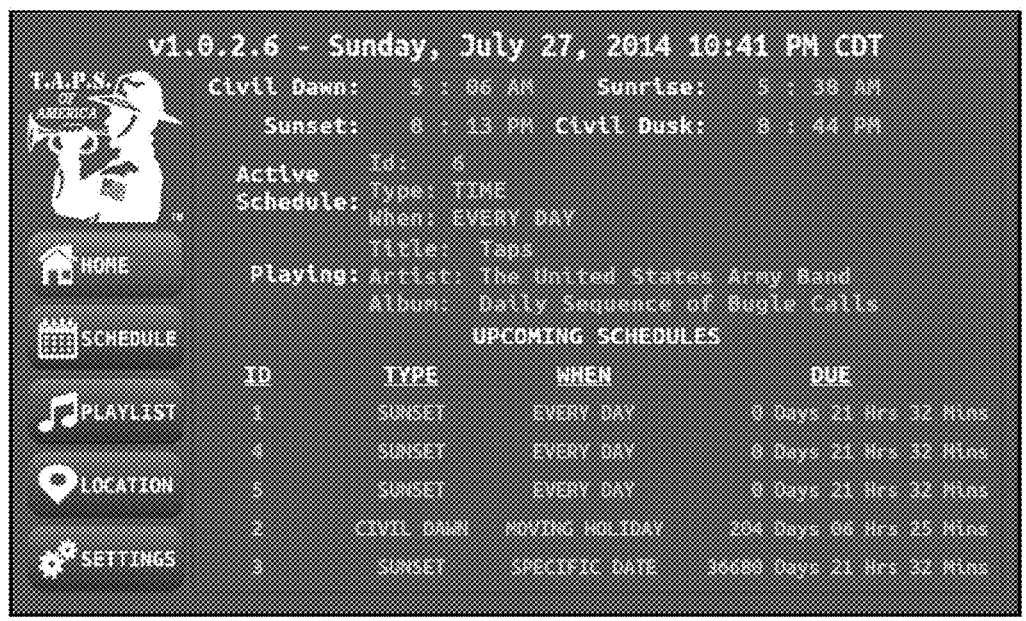
FIGS. 3 through 6 are nonlimiting representations of screens that may be displayed with the timeline audio player system represented in FIG. 1.
Figure 4:
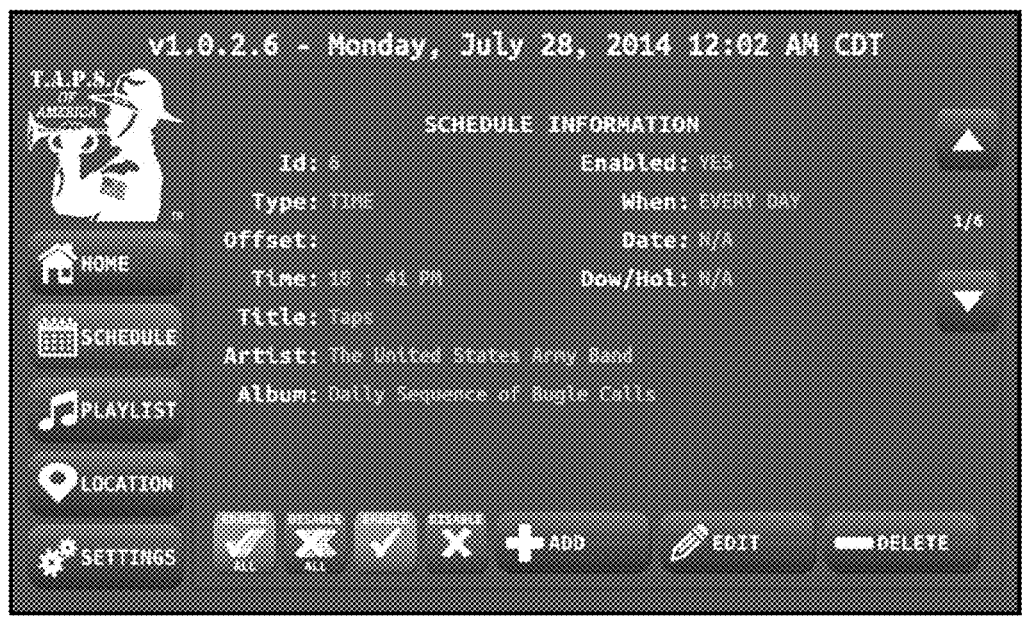
Figure 5:
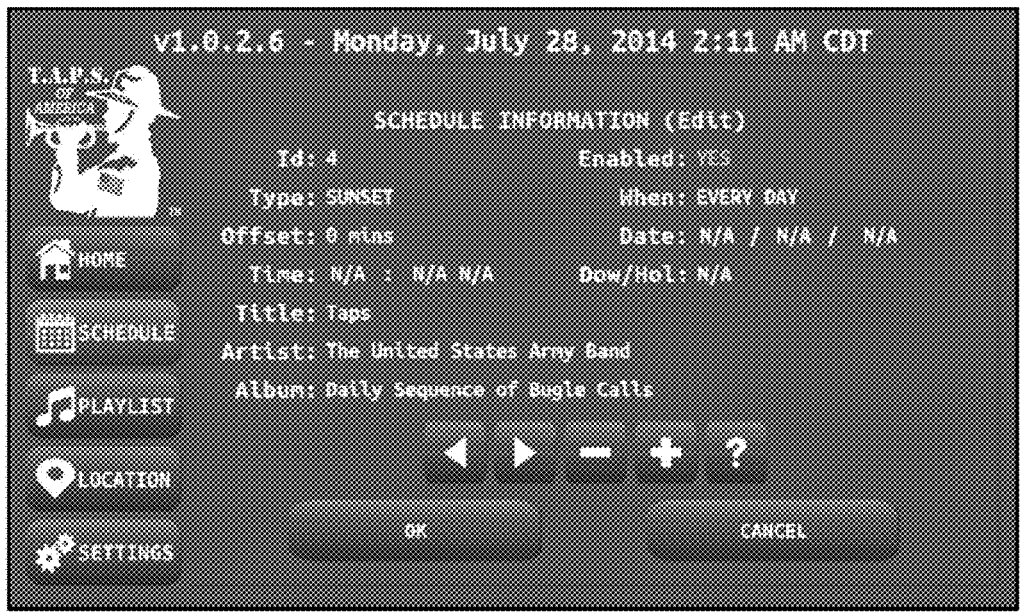
Figure 6:

FIG. 3 is a nonlimiting representation of a screen shot of a "home" screen that may be displayed on the touchscreen 3 of the computer 1. As evident from FIG. 3, the home screen may display current time information, a list of schedules ("Upcoming Schedules") that have been stored on the computer 1, and information corresponding to an active audio file being played ("Playing"). Schedules uploaded onto the computer 1 can preferably be enabled or disabled through the touchscreen 3. FIG. 4 is a nonlimiting representation of a screen shot of a "schedule" screen that can be used to create, edit, delete schedules as well and enable or disable them. FIG. 5 is a nonlimiting representation of a screen shot of a "view, add, edit schedule" screen that can be shown when modifying a new or existing schedule from the schedule screen. From this screen, new schedules can be created and existing schedules can be viewed or edited. In addition, this screen provides the ability to set programmable offset times ("Offset"), by which the playing of an audio file (e.g., "Taps") can be scheduled to commence at a time relative to an astronomical event (e.g., zero minutes from "Sunset") of scheduled days ("Every Day"). FIG. 6 is a nonlimiting representation of a screen shot of a "play list" screen that can be used to add, delete, and play audio files. Audio files in the play list can be included in schedules created with the schedule screen of FIG. 5.

Advantages of the present invention include, without limitation, the ability to schedule and play audio files at repetitive and moving events as previously described. A particularly preferred feature is the ability to select and play one or more audio files at (or near) an astronomical event (e.g., at or near civil dawn, sunrise, sunset, and/or civil dusk), and to interrupt the playing of another audio file in order to play the selected audio file(s) at the astronomical event. Another particularly preferred feature is the ability to use programmable offset times, by which playing of an audio file commences or is completed at a time relative to the astronomical event for the location of the system, for example, as established by the GPS coordinates retrieved from a lookup table stored on the computer 1.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. As nonlimiting examples, the system may include the capability of remote configuring of audio file scheduling via an Internet connection, over cellular, satellite, WIFI, or Ethernet connections, or a local wireless network. Time synchronization with other units is also possible to stage different music scenarios, such as crosstown delayed playing, accomplished over the Internet or some other wireless or wired network, such as a local wireless network. In addition, time synchronization of current time can be employed to improve the accuracy of unit synchronization. The invention should therefore not be limited by the above described embodiments, and the scope of the invention is to be limited only by the following claims.

The invention claimed is:

1. A system for autonomously broadcasting at multiple locations within a town at least a first audio file at at least one astronomical event on predetermined days over multiple calendar years, the system comprising:
   a standalone computer comprising nonvolatile memory in which at least the first audio file is stored;
   a computer program running on the standalone computer;
   a power audio amplifier connected to the standalone computer; and
   a speaker system connected to the power audio amplifier for broadcasting at least the first audio file stored in the nonvolatile memory, the speaker system comprising multiple speakers located at the multiple locations within the town;
   wherein the computer program comprises a configuration application adapted to define a first schedule and an interface for inputting user data that identifies an astronomical event and a holiday for when the first audio file is to be autonomously broadcast, wherein the astronomical event occurs at a different time of day on a daily basis and at different times of day at the multiple locations within the town, and wherein the holiday has a calendar date that varies on a yearly basis over the multiple calendar years, the computer program further comprising a service running on the computer and executing a scheduling algorithm that causes the first audio file to be autonomously broadcast by the speakers within the town at the astronomical event on the holiday on a yearly basis over the multiple calendar years;
   wherein the computer program is configured to broadcast the first audio file at a time delay between the speakers located at the multiple locations within the town such that the first audio file is broadcast by each individual speaker of the speakers at the astrological event based on the location of each individual speaker.

2. The system according to claim 1, wherein the speaker system comprises more than one speaker spread out across a town.

3. The system according to claim 2, wherein the computer program is configured to broadcast the first audio file at a time delay between the more than one speaker spread out across the town.

4. The system according to claim 1, wherein the nonvolatile memory further stores information that correlates locations, dates, and time zones to the astronomical event.

5. The system according to claim 1, wherein the astronomical event is chosen from the group consisting of civil dawn, sunrise, sunset, and civil dusk.

6. The system according to claim 1, wherein the computer program is adapted to broadcast the first audio file at a programmable offset time relative to the astronomical event.

7. The system according to claim 1, wherein the computer program is adapted to broadcast a second audio file and is adapted to interrupt the playing of the second audio file to broadcast the first audio file.

8. A method of using the system of claim 1 comprising using the computer program to define the first schedule, using the computer program to input into the first schedule the astronomical event and the holiday for when the first audio file is to be autonomously broadcast, and executing the scheduling algorithm to broadcast the first audio at the astronomical event on the holiday on a yearly basis over the multiple calendar years.

9. The method according to claim 8, wherein the scheduling algorithm does not utilize sensed ambient light to determine when to play the first audio file of the first schedule.

10. A method of autonomously broadcasting at multiple locations within a town at least a first audio file at at least one astronomical event on predetermined days over multiple calendar years, the method comprising:
storing at least the first audio file in nonvolatile memory of a standalone computer;
using a computer program of the standalone computer to define a first schedule that contains the first audio file;
using the computer program of the standalone computer to input into the first schedule user input data that identifies an astronomical event and a holiday for when the first audio is to be autonomously broadcast, wherein the astronomical event occurs at a different time of day on a daily basis and at different times of day at the multiple locations within the town, and wherein the holiday has a calendar date that varies on a yearly basis over the multiple calendar years; and
executing a scheduling algorithm that autonomously broadcasts the first audio file at the astronomical event on the holiday on a yearly basis over the multiple calendar years with a speaker system comprising multiple speakers located at the multiple locations within the town, wherein the computer program is configured to broadcast the first audio file at a time delay between the speakers located at the multiple locations within the town such that the first audio file is broadcast by each individual speaker of the speakers at the astrological event based on the location of each individual speaker.

11. The method according to claim 10, wherein the speaker system comprises more than one speaker spread out across a town.

12. The method according to claim 11, wherein the computer program broadcasts the first audio file at a time delay between the more than one speaker spread out across the town.

13. The method according to claim 10, further comprising storing information in the nonvolatile memory that correlates locations, dates, and time zones to the astronomical event.

14. The method according to claim 10, wherein the astronomical event is chosen from the group consisting of civil dawn, sunrise, sunset, and civil dusk.

15. The method according to claim 10, wherein the first audio file is broadcast at a programmable offset time relative to the astronomical event.

16. The method according to claim 10, further comprising broadcasting a second file audio and interrupting the playing of the second audio file to broadcast the first audio file.

17. The method according to claim 10, further comprising:
using the computer program of the standalone computer to define at least a second schedule that contains at least a second audio file;
using the computer program of the standalone computer to input into the second schedule user input data that identifies a predetermined time and a predetermined day for when the second audio is to be autonomously broadcast; and
executing the scheduling algorithm that broadcasts the second audio file at the predetermined time on the predetermined day.

18. The method according to claim 10, wherein the scheduling algorithm does not utilize sensed ambient light to determine when to broadcast the first audio file of the first schedule.

* * * * *